(12) United States Patent
Hattori

(10) Patent No.: US 8,049,493 B2
(45) Date of Patent: Nov. 1, 2011

(54) RESIN-MOLDED PRODUCTS AND METHODS OF MANUFACTURING THE SAME

(75) Inventor: Yasuhiko Hattori, Aichi-ken (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 1115 days.

(21) Appl. No.: 11/764,826

(22) Filed: Jun. 19, 2007

(65) Prior Publication Data
US 2007/0290680 A1 Dec. 20, 2007

(30) Foreign Application Priority Data
Jun. 19, 2006 (JP) ................... 2006-168634

(51) Int. Cl.
*G01B 7/14* (2006.01)
*G01B 7/30* (2006.01)
(52) U.S. Cl. ............ 324/207.25; 324/207.21; 324/207.2
(58) Field of Classification Search ............. 324/207.21, 324/207.25, 173–174, 207.2
See application file for complete search history.

(56) References Cited

U.S. PATENT DOCUMENTS

| | | | |
|---|---|---|---|
| 3,504,209 A * | 3/1970 | Russell | 310/171 |
| 6,971,264 B2 * | 12/2005 | Morimoto et al. | 73/114.36 |
| 7,210,451 B2 * | 5/2007 | Ikeda et al. | 123/399 |
| 2002/0180602 A1 | 12/2002 | Yoakum | |

FOREIGN PATENT DOCUMENTS

| | | |
|---|---|---|
| JP | 1125213 A | 5/1989 |
| JP | 2002-544745 A | 12/2002 |
| JP | 2004 084503 | 3/2004 |

* cited by examiner

*Primary Examiner* — Reena Aurora
(74) *Attorney, Agent, or Firm* — Dennison, Schultz & MacDonald

(57) ABSTRACT

The present invention includes a resin-molded product including at least one magnet having opposite faces extending in directions intersecting with a magnetizing direction of the at least one magnet. The present invention also includes a resin portion molded with the at least one magnet by an insertion molding process, wherein the opposite faces of the at least one magnet are substantially entirely embedded within the resin portion.

12 Claims, 5 Drawing Sheets

RESIN-MOLDED PRODUCTS AND METHODS OF MANUFACTURING THE SAME

This application claims priority to Japanese patent application serial number 2006-168634, the contents of which are incorporated herein by reference.

BACKGROUND OF THE INVENTION

1. Field of the Invention

The present invention relates to resin-molded products and methods of manufacturing the resin molded products.

2. Description of the Related Art

Japanese Laid-Open Patent Publication No. 2004-84503 teaches a device having a rotational angle sensor and used for detecting an open angle of a throttle valve disposed within a throttle body. The rotational angle sensor includes magnets (permanent magnets), a rotational member (a rotor) fixedly mounted to a shaft portion of the throttle valve, and a stationary member (a sensor cover) that includes a magnetic detecting element. The rotational angle of the rotational member can be used in a non-contact manner based on an output signal from the magnetic detecting element.

In some cases, the rotational member is a resin-molded product that is molded by an insertion molding process, in which resin is molded within a mold with magnets inserted into the mold. FIG. 8 shows a conventional rotational member that is a resin-molded product.

As shown in FIG. 8, a rotational member 130 has a substantially cylindrical resin body 138 and a pair of right and left magnets 134 each having a substantially quadrangular prism-like configuration. The magnets 134 are disposed on the inner circumference of the body 138 and are positioned symmetrically with each other, so that one face 134a of each magnet 134 is entirely exposed to the inner space of the resin body 138. Another face 134b of each magnet 134 intersecting with the face 134a is substantially completely positioned within the resin material of the body 138.

In the molding process to create the aforementioned structure (the resin body 130 with the magnets 134 inserted into a cavity of a mold), an unbalance can occur between the pressure of the molten resin applied to the face 134a and the pressure of the molten resin applied to the face 134b. Thus, the pressure applied to the face 134a may be low, while the pressure applied to the face 134b may be high. Due to this unbalance, a moment M may be produced to force one end (lower end as viewed in FIG. 8) of each magnet 134 in a direction radially outward with respect to the body 138 about the other end (upper end as viewed in FIG. 8) of each magnet 134. In an extreme case, the magnets 134 may be break.

Thus, there is a need in the art for resin-molded products and methods of manufacturing the resin-molded products, which can prevent or minimize breakage of magnets.

SUMMARY OF THE INVENTION

One aspect according to the present invention includes resin-molded products having a magnet piece(s) and a resin portion. The magnet piece(s) has opposite faces extending in directions intersecting with a magnetizing direction of the magnet piece(s). The resin portion is molded with the magnet piece(s) by an insertion molding process. The opposite faces of the magnet piece(s) are embedded within the resin portion.

Therefore, during the molding process, it is possible to prevent or minimize unbalance between pressures applied to the opposite faces of the magnet piece(s) by the molten resin. As a result, it is possible to prevent or minimize breakage of the magnet piece(s) due to pressure unbalance during the molding process.

In one embodiment, each of the opposite faces of the magnet piece(s) has a substantially rectangular configuration. In another embodiment, each of the opposite faces has a configuration elongated in one direction. In a further embodiment, the resin portion has a substantially cylindrical tubular configuration and an inner circumferential region, and the magnet piece(s) is disposed within the inner circumferential region.

Another aspect according to the present invention includes methods of manufacturing the resin-molded products. The method includes the steps of providing a mold with a cavity for molding the resin-molded product; setting magnet supports in the mold cavity, the magnet supports supporting opposite ends of the magnet piece(s) with respect to directions intersecting with a magnetizing direction of the magnet piece(s); and injecting molten resin into the mold cavity while the magnet piece(s) is supported by the magnet supports.

By using this method, it is possible to prevent the opposite ends of the magnet piece(s) from movement during the molding process. Therefore, it is possible to further reliably prevent or minimize breakage of the magnet piece(s) that may occur due to pressure unbalance during the molding process.

In one embodiment, the magnet supports support corner portions of the opposite ends of the magnet piece(s), the corner portions diagonally oppose to each other. With this arrangement, it is possible to minimize contact areas of the magnet supports with the magnet piece(s). Therefore, it is possible to prevent or minimize potential breakage of the magnet piece(s) due to contact with the magnet supports.

In another embodiment, the magnet supports support the corner portions of opposite ends of the magnet piece(s) with respect to the ridgelines of the corner portions. With this arrangement, it is possible to further minimize contact areas of the magnet supports with the magnet piece(s).

A further aspect according to the present invention includes rotational angle sensors including the resin-molded product as a rotary member. The sensor further includes a stationary side member including a magnetic detection element or sensor, so that a rotational angle of the rotary member can be detected in a non-contact manner based on an output signal from the magnetic detection element.

Therefore, it is possible to provide rotational angle sensors having the rotary member with the magnet piece(s) that reduces the possibility of damage or breaking.

A still further aspect according to the present invention includes devices for detecting open angles of throttle valves. The device includes a throttle gear as the rotary member. The throttle gear is attached to a shaft of the throttle valve and is configured to transmit rotation to the throttle valve. The stationary side member is disposed on a throttle body, and the throttle body defines an intake air channel that is configured to be opened and closed by the throttle valve.

With this configuration, it is possible to provide detecting devices having the throttle gear with the magnet piece(s) that reduces the possibility of damage or breaking.

DETAILED DESCRIPTION OF THE INVENTION

Each of the additional features and teachings disclosed above and below may be utilized separately or in conjunction with other features and teachings to provide improved resin-molded products and methods of manufacturing such products. Representative examples of the present invention, which utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
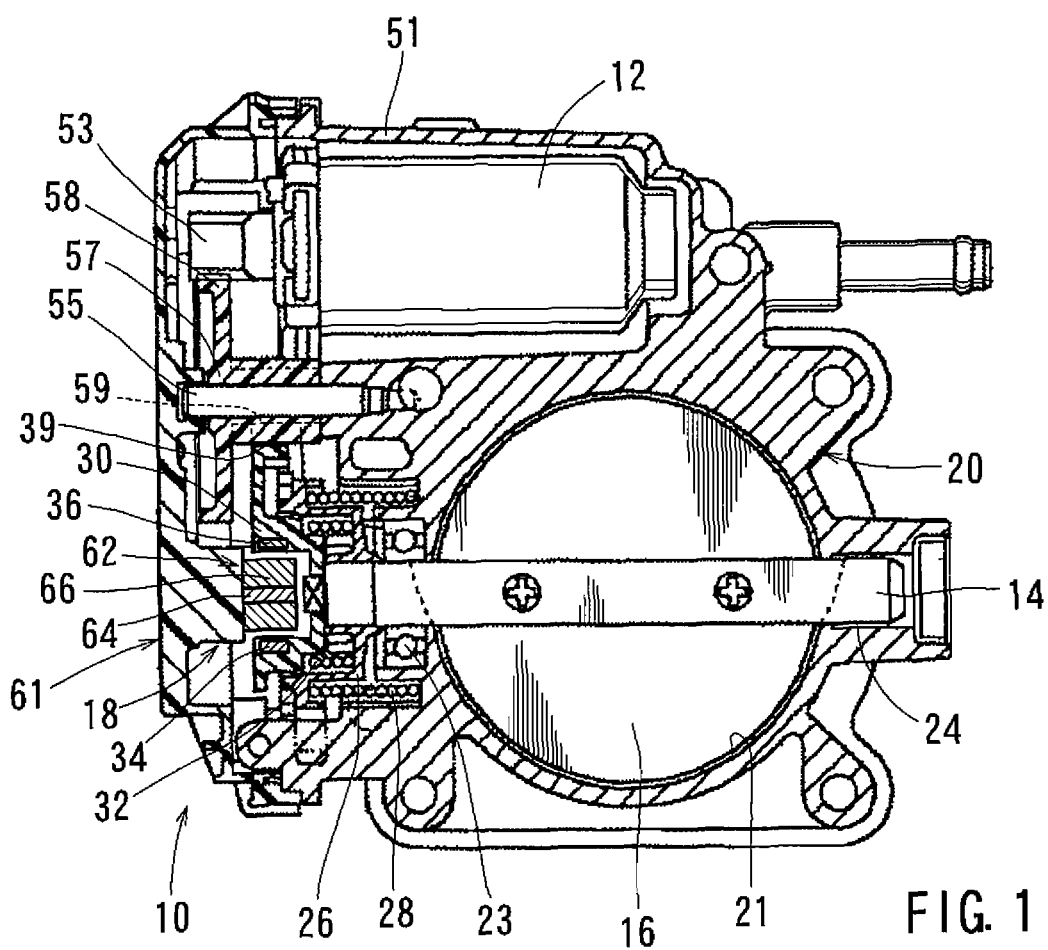
FIG. 1 is a cross sectional view of a throttle control device according to an embodiment of the present invention.

An embodiment according to the present invention will now be described with reference to FIGS. 1 to 7. Referring to FIG. 1, a throttle control device 10 is shown and is used for controlling a supply of intake air to an internal combustion (not shown).

As shown in FIG. 1, the throttle control device 10 includes a throttle valve 16 having a throttle shaft 14 that is rotatably driven by a controlled motor 12 via a transmission gear mechanism, so that the throttle valve 16 can be opened and closed. The throttle control device 10 also includes a detection device 18 for detecting a degree of opening or a rotational angle of the throttle valve 16.

An intake air channel 21 is defined within a main body 20 of the throttle control device 10 and extends therethrough in a direction perpendicular to the sheet of FIG. 1. The throttle shaft 14 extends across the intake air channel 21 in a diametrical direction (right and left directions as viewed in FIG. 1). Opposite ends of the throttle shaft 14 are respectively rotatably supported by the main body 20 via a roller bearing 23 and a metal bearing 24. The throttle valve 16 is attached to the throttle shaft 14. The throttle valve 16 has a substantially disk-like shape and is configured as a butterfly-type valve.

A substantially cup-shaped spring seat 26 is fixedly attached to one end (left end as viewed in FIG. 1) of the throttle shaft 14 on the side of the roller bearing 23. A torsion coil spring 28 is interposed between the spring seat 26 and a portion of the main body 20 opposing to the spring seat 26. The torsion coil spring 28 biases the throttle valve 16 as well as the throttle shaft 14 in a closing direction of the throttle valve 16. A throttle gear 30 is fixedly attached to the one end of the throttle shaft 14 for rotatably driving the throttle shaft 14. A torsion coil spring 32 having a smaller coil diameter than the torsion coil spring 28 is interposed between the throttle gear 30 and the spring seat 26. The throttle gear 30 is a resin-molded product and is molded by an insertion molding process of resin with magnet pieces 34 and yokes 36. The magnet pieces 34 serve as parts of the detecting device 18. The yokes 36 serves to form a part of a magnetic circuit.

Figure 2:
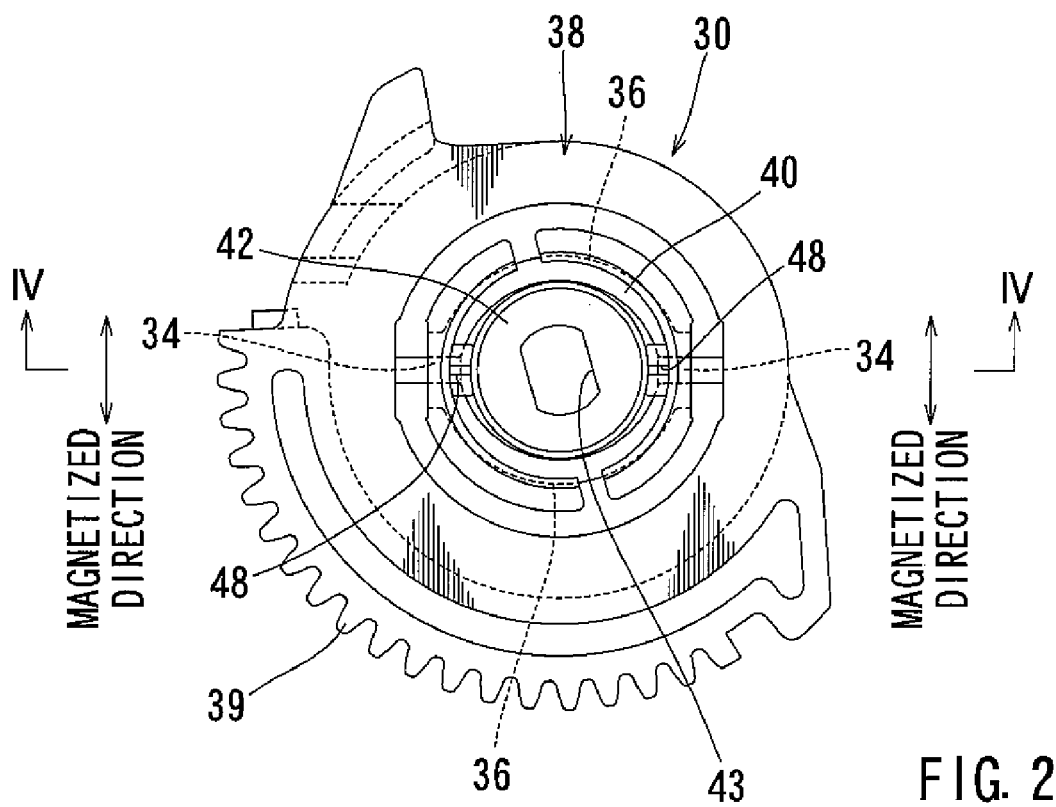
FIG. 2 is a front view of a throttle gear of the throttle control device.
Figure 3:
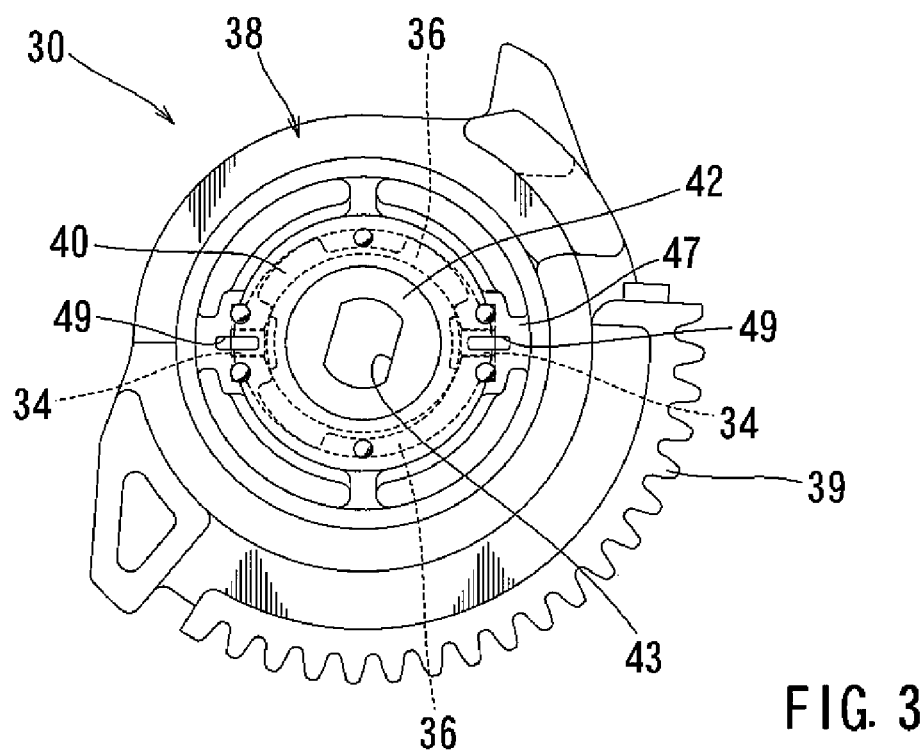
FIG. 3 is a rear view of the throttle gear

The throttle gear 30 will be further described with reference to FIGS. 2 to 6. As shown in FIG. 2, the throttle gear 30 has a gear body 38 formed of resin. A sector gear portion 39 is formed integrally with a front side part (upper part as viewed in FIG. 4) of the outer peripheral portion of the gear body 38 and has the same axis as the gear body 38 (see FIGS. 3 and 4). A cylindrical tubular boss portion 40 is formed integrally with the inner peripheral portion of the gear body 38 and has the same axis as the gear body 38.

Figure 4:
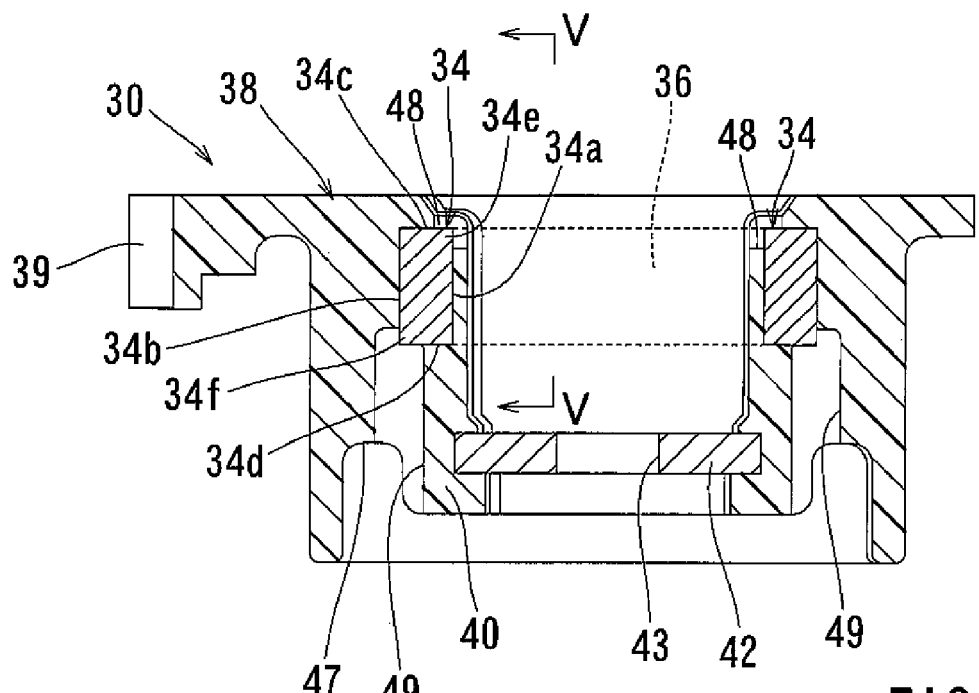
FIG. 4 is a cross sectional view taken along line IV-IV in FIG. 2.
Figure 5:
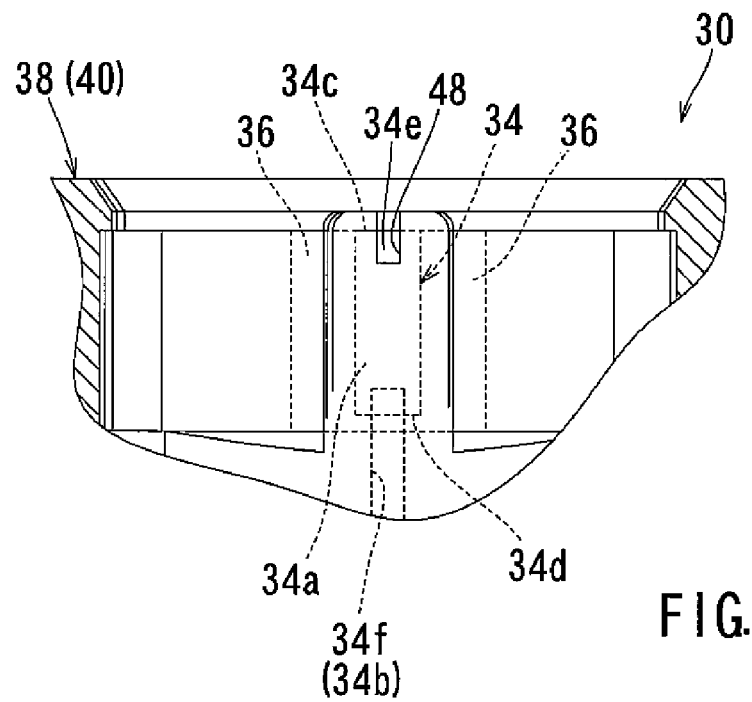
FIG. 5 is a cross sectional view taken along line V-V in FIG. 4.

As shown in FIG. 4, a substantially circular metal attaching plate 42 is attached to the bottom end or a rear end (lower end as viewed in FIG. 1) of the boss portion 40 and is positioned coaxially with the boss portion 40. The attaching plate 42 is fitted to the one end of the throttle shaft 14 (see FIG. 1) and is joined thereto by crimping one end of the throttle shaft 14. An attaching hole 43 is formed in the central portion of the attaching plate 42 and has opposite parallel sides in order to engage the one end of the throttle shaft 14 at a predetermined angular position with respect to the throttle shaft 14 and to prevent rotation relative to the throttle shaft 14. The attaching plate 42 can be integrated with the gear body 36 by an insertion molding process (using resin) by inserting the attaching plate 42, the magnet pieces 34 and the yokes 36 into the mold.

Figure 6:
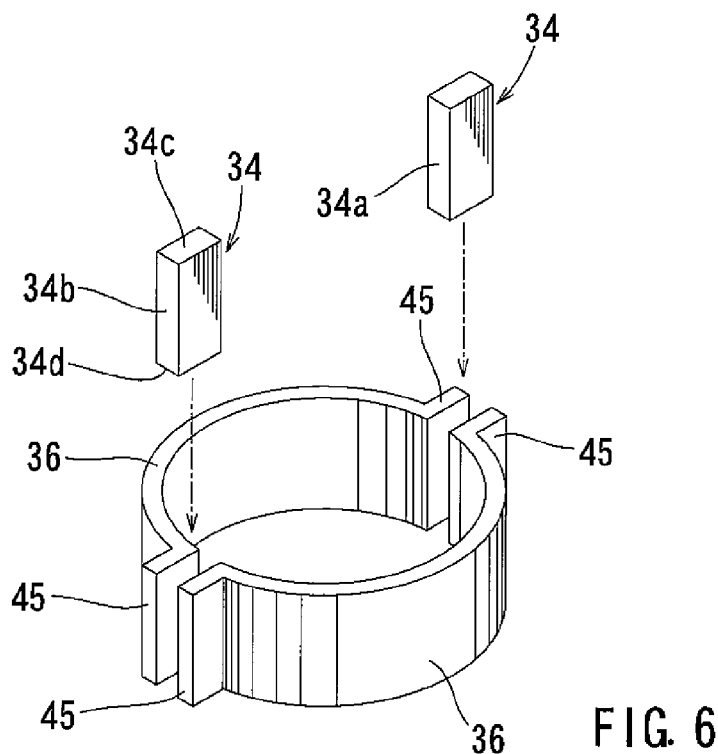
FIG. 6 is an exploded perspective view of magnet pieces and yokes of the throttle gear.

In this embodiment, a pair of the magnet pieces 34 and a pair of the yokes 36 can be positioned at the boss portion 40 of the gear body 38 (see FIGS. 4 and 6). The magnet pieces 34 are formed of permanent magnet material, such as samarium-cobalt (Sm—Co) magnet material, and each has a quadrangular or square prism-like configuration as shown in FIG. 6.

As shown in FIG. 6, the yokes 36 are formed of magnetic material and each can have a substantially semicircular arc-shaped configuration. Here, the yokes 36 are positioned to together form a substantially complete circular ring. Radially outwardly extending flanges 45 are formed on opposite ends in the circumferential direction of each yoke 36. The magnet pieces 34 are positioned between the flanges 45 of one of the yokes 36 and the flanges 45 of the other of the yokes 36. Therefore, during the molding process of the throttle gear 30 (see FIGS. 2 to 5), the magnets 34, the yokes 36 and the attaching plate 42 are positioned within the mold in the predetermined arrangement as described above.

Each magnet 34 is magnetized in a direction toward or away from the corresponding opposing flanges 45 of the yokes 36 (see FIG. 6) as indicated by arrows in FIG. 2. Therefore, an inner face 34a and an outer face 34b of each magnet piece 34 respectively positioned on the inner circumferential side and the outer circumferential side of the boss portion 40 are configured as faces extending across or perpendicular to the magnetizing direction. The inner and outer faces 34a and 34b of each magnet piece 34 are embedded within the mold resin of the boss portion 40 of the gear body 38. Also, a front face 34c and a rear face 34d of each magnet piece 34 respectively positioned on the front side (upper side as viewed in FIG. 4) and the rear side (lower side as viewed in FIG. 4) of the boss portion 40 are embedded within the mold resin of the boss portion 40 of the gear body 38. Each of the inner face 34a and the outer face 34b of each magnet piece 34 has a rectangular configuration, in particular, a rectangular configuration elongated along the axial direction of the boss portion 40 (see FIG. 6).

As shown in FIG. 4, an annular recess 47 is formed in the rear surface (lower surface as viewed in FIG. 4) of the gear body 38 about the boss portion 40. A pair of front-side slits 48 is formed in the front surface (upper surface as viewed in FIG. 4) of the gear body 38 and each slit 48 extends to reach a corner portion 34e of each magnet piece 34, where the inner face 34a and the front face 34c intersect with each other (see FIG. 5). In addition, a pair of rear-side slits 49 are formed in the rear surface (lower surface as viewed in FIG. 4) of the gear body 38 and each slit 49 extends to reach a corner portion 34f of each magnet piece 34, where the outer face 34b and the rear face 34d intersect with each other (see FIG. 3).

As shown in FIG. 1, a motor housing portion 51 is formed on one side (upper side as viewed in FIG. 1) of the main body 20. An electric motor or control motor 12 is disposed within the motor housing portion 51 in order to drive the throttle valve 16 for opening and closing the same. A pinion 53 is fixedly attached to an output shaft (not shown) of the control motor 12. An intermediate gear 57 serving as a reduction gear is rotatably supported on a gear shaft 55 that is supported within the main body 20. The intermediate gear 57 includes a large-diameter gear part 58 and a small-diameter gear part 59. The gear part 58 engages the pinion 53 and the gear part 59 engages the gear portion 39 of the throttle gear 39. Therefore, as the control motor 12 is rotatably driven, the rotation is transmitted from the control motor 12 to the throttle gear 30 via the intermediate gear 57, so that the throttle valve 16 rotates with the throttle shaft 14 so as to be controlled for opening and closing.

A cover 61 is attached to the main body 20 on the side of the gear mechanism (left side as viewed in FIG. 1). A sensor mount member 62 protrudes from the inner side wall of the cover 61 and is inserted into the boss portion 40 of the throttle gear 30 while the sensor mount member 62 does not contact the boss portion 40. A magnetic detecting element 64 and a stator 66 is assembled to the sensor mount member 62. For example, the magnetic detecting element 64 may be a Hall element, a Hall IC or a magnetoresistive element. The magnetic detecting element 64 can output electric signals, such as voltage signals, corresponding to the intensity of the magnetic field that is produced by the magnet pieces 34 and varies with rotation of the throttle gear 30 that includes the magnet pieces 34. The stator 66 is formed of metal or magnetic material, and serves to converge the magnetic flux. In this embodiment, the cover 61 and the stator 55 are integrated with the sensor mount member 62 by an insertion molding process of the resin of the sensor mount member 62 with the cover 61 and the stator 55 inserted into a corresponding mold. The main body 20 and the cover 61 constitute a throttle body. The cover 61 serves as a fixed side member or a throttle-body-side member of the throttle body.

As the cover 61 is attached to the main body 20, the sensor mount member 62 is inserted into the boss portion 40 of the throttle gear 30 such that the sensor mount member 62 does not contact the boss portion 40. Therefore, a detecting face of the magnetic detecting element 64 is opposed to the inner circumferential surface of the boss portion 40 of the throttle gear 30 without contacting therewith. Due to the magnetic forces of the magnet pieces 34 of the throttle gear 30, each yoke 36 has an N-pole and an S-pole and a magnetic field extending across the detecting face of the magnetic detecting element 64, which is disposed within the sensor mount portion 62 of the cover 61. The intensity of the magnetic field may vary in response to an angular position of the yokes 36 as well as the magnet pieces 34 relative to the magnetic detecting element 64. Therefore, the output voltage of the magnetic detecting element 64 varies with change of the intensity of the magnetic field and provides a voltage signal indicative of the rotational angle (degree of opening) of the throttle valve 16 that rotates together with the throttle gear 30.

Thus, the detection device 18 is configured as a non-contact rotational angle sensor that detects a rotational angle (degree of opening) of the throttle gear 30, which has the magnet pieces 34, based on the output signal of the magnetic detecting element 64 that varies with rotation of the throttle gear 30. The output side of the magnetic detecting element 64 is connected to an external detection circuit and an engine controller, etc., via a terminal (not shown) provided on the cover 61.

The throttle control device 10 may be installed on an internal combustion engine, such as that of a vehicle. In general, when a driver of a vehicle depresses an accelerator pedal, the degree of depression is detected by an accelerator depression sensor, which outputs a depression signal to an engine controller. Then, the engine controller outputs a drive signal to the control motor 12 in order to drive the control motor 12 such that the degree of opening of the throttle valve 16 corresponds to the degree of depression of the accelerator pedal. The driving force of the control motor 12 is transmitted to the intermediate gear 57 via the pinion 53, and the intermediate gear 57 drives the throttle gear 30. Then, the throttle valve 16 as well as the throttle shaft 14 rotates against the biasing force or the torsion coil spring 28 to the set rotational angle. During this operation, the magnetic detecting element 64 of the detecting device 18 outputs a signal corresponding to the rotational angle of the throttle gear 30 or the degree of opening of the throttle valve 16 and the output signal is inputted to the engine controller and is used, for example, for calculating the amount of fuel to be injected.

Figure 7:
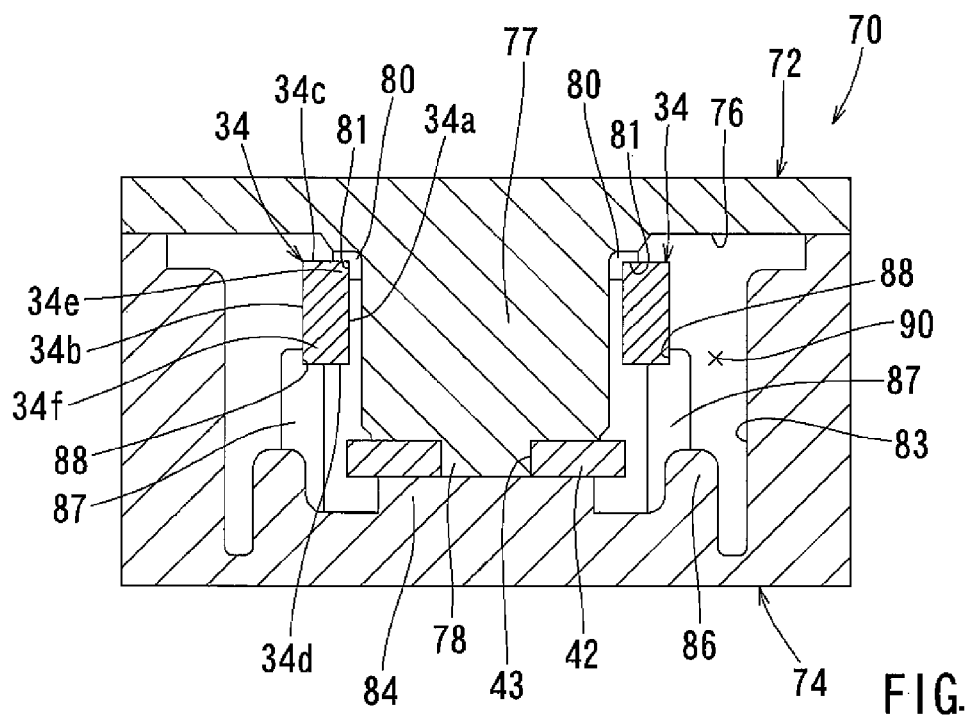
FIG. 7 is a vertical sectional view of a mold for molding the throttle gear.
Figure 8:
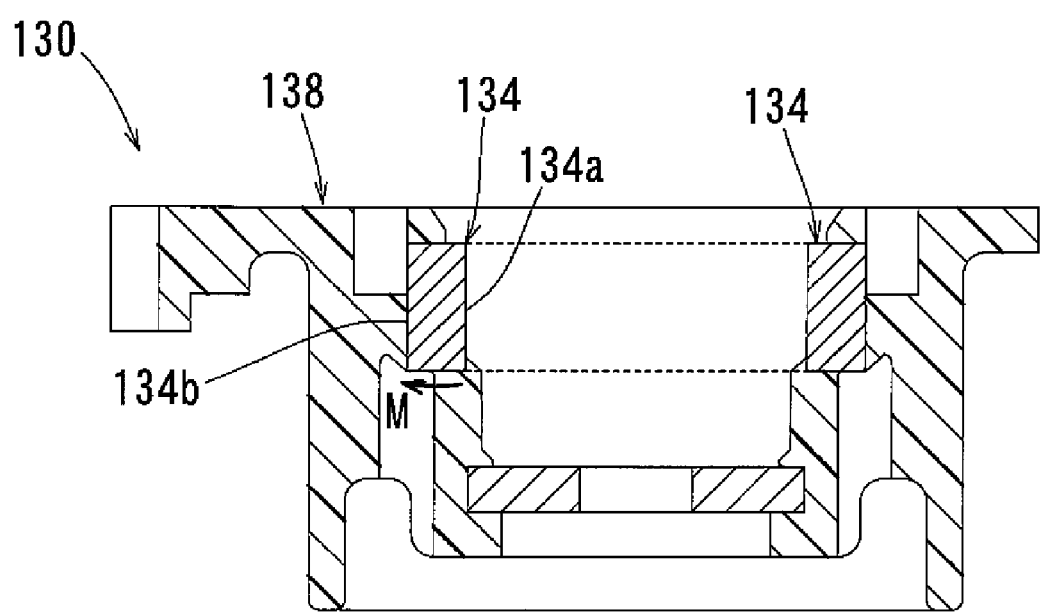
FIG. 8 is a cross sectional view of a known rotary member.

A mold used for a method of molding the throttle gear 30 will now be described with reference to FIG. 7. As shown in FIG. 7, a mold 70 includes an upper mold half or a stationary mold half 72 and a lower mold half or a movable mold half 74 that can be clamped against and released from the stationary mold half 72.

A forming surface 76 is defined on the lower surface of the stationary mold half 72 and is configured to conform to the configuration of the front surface of the throttle gear 30 (see FIGS. 2 to 5). A core mold portion 77 extends downward from the forming surface 76 and is configured to conform to the configuration of the inner peripheral surface of the boss portion 40 of the gear body 38 of the throttle gear 38. The lower end surface of the core mold portion 77 opposes to the front surface of the attaching plate 42 and has a projection 78 for engaging the attaching hole 43 of the attaching plate 42. A pair of magnet supports 80 extends from the outer circumferential surface of the base end of the core mold portion 77. Each magnet support 80 has a thin plate-like configuration and has a support recess 81 for engaging the corner portion 34e of the corresponding magnet piece 34 of the throttle gear 30, where the inner face 34a and the front face 34c intersect with each other and which is proximal to the front side end portion (upper end portion as viewed in FIG. 7) of the corresponding magnet piece 34. In addition, each magnet support 80 is positioned to oppose to the central portion of the corner portion 34e with respect to the direction of the ridge line defined by the corner portion 34e (i.e., a direction perpendicular to the sheet of FIG. 7) of the corresponding magnet piece 34. The magnet supports 80 may be formed integrally with the stationary mold half 72. Alternatively, the magnet supports 80 may be formed separately from the stationary mold half 72 and attached to the stationary mold half 72.

A forming surface 83 is defined on the upper surface of the movable mold half 72 and is configured to conform to the configuration of the rear surface of the throttle gear 30 (see FIGS. 2 to 5). A core mold portion 84 extends upward from the forming surface 83 and is configured to conform to the configuration of the inner peripheral surface of the end portion on the rear side of the boss portion 40 of the gear body 38 of the throttle gear 38 (see FIG. 4). The upper end surface of the core mold portion 84 is opposed to the rear surface of the attaching plate 42 and to the lower end surface of the projection 78 of the core mold portion 77 of the stationary mold half 72. An annular projection 86 is formed on the forming surface 83 and is configured to conform to the configuration of the recess 47 on the rear side of the gear body 38 (see FIG. 4). In addition, a pair of magnet supports 87 extend upward from the forming surface 83 and are positioned proximity to the inner portion of the annular projection 86. Each magnet support 87 has a thin plate-like configuration and has a support recess 88 for engaging the corner portion 34f of the corresponding magnet piece 34 of the throttle gear 30, where the outer face 34b and the rear face 34d intersect with each other and which is proximal to the rear side end portion (lower end portion as viewed in FIG. 7) of the corresponding magnet piece 34. In addition, each magnet support 87 is positioned to oppose to the central portion of the corner portion 34f with respect to the direction of the ridge line defined by the corner portion 34f (i.e., a direction perpendicular to the sheet of FIG. 7) of the corresponding magnet piece 34. In this way, each magnet support 80 of the stationary mold half 74 and each magnet support 87 of the movable mold half 74 support the corresponding magnet piece 34 at its corner portions 34e and 34f, which oppose diagonally to each other. Also, the magnet supports 87 may be formed integrally with the movable mold half 74. Alternatively, the magnet supports 87 may be formed separately from the movable mold half 74 and attached to the movable mold half 74.

As shown in FIG. 7, when the movable mold half 74 is clamped against the stationary mold half 72, a cavity 90 for forming the throttle gear 30 (see FIGS. 2 to 5) is defined between the movable mold half 74 and the stationary mold half 72. At given positions, a pair of the magnet pieces 34, a pair of the yokes 36 (see FIG. 6) and the attaching plate 42 are positioned within the cavity 90. More specifically, the pair of the magnet pieces 34 are supported by the magnet support portions 80 of the stationary mold half 72 and the magnet support portions 87 of the movable mold half 74, while the magnet pieces 34 are positioned between the flanges 45 of the yokes 36 (see FIG. 6). The attaching plate 42 is supported in position between the core mold portion 77 of the stationary mold half 72 and the core mold portion 84 of the movable mold half 74. The pair of the yokes 36 are supported in position between yoke support portions (not shown) provided on the stationary mold half 72 and corresponding yoke support portions (not shown) provided on the movable mold half 74.

During the resin molding process of the throttle gear 30, molten resin is injected into the cavity 90 of the mold 70 under a predetermined pressure. Then, the magnet pieces 34, the yokes 36 and the attaching plate 42 positioned within the cavity 90 are integrated with the injected resin. In addition, the flow of the injected molten resin can reach and cover substantially the entire inner face 34a and substantially the entire outer face 34b, which extend in directions intersecting with the magnetizing direction of the respective magnet pieces 34. Therefore, unbalance between the pressure of the molten resin applied to the inner face 34a and the pressure of the molten resin applied to the outer face 34b can be mitigated or eliminated.

With the insertion molding process described above, the magnet pieces 34, the yokes 36 and the outer peripheral portion of the attaching plate 42 are embedded into the molten resin that molds the gear body 38 and are fixed in position after curing or solidification of the molten resin. Therefore, the throttle gear 30 having the magnet pieces 34, the yokes 36 and the attaching plate 42 integrated with the resin gear body 38 (see FIGS. 2 to 5) can be taken out of the mold 70 by opening the mold 70 after curing or solidification of the molten resin. The slits 48 on the front side of the gear body 38 (see FIGS. 2, 4 and 5) can be formed when the magnet supports 80 of the stationary mold half 72 (see FIG. 7) are removed. Similarly, the slits 49 on the rear side of the gear body 38 (see FIGS. 3, 4 and 5) can be formed when the magnet supports 87 of the movable mold half (see FIG. 7) are removed.

With the throttle gear 30 (see FIGS. 2 to 5) described above, due to the insertion molding process, the inner face 34a and the outer face 34b extending in a direction intersecting with the magnetizing direction of each magnet piece 34 are embedded into the resin of the boss portion 40 of the gear body 38. Therefore, it is possible to eliminate or minimize unbalance between the pressure of the molten resin applied to the inner face 34a and the pressure of the molten resin applied to the outer face 34b. Hence, it is possible to prevent or minimize potential breakage of the magnet pieces 34 that may be caused by the unbalance of the pressure of the molten resin. This improvement is particularly advantageous in the case that the magnet pieces 34 are formed of fragile permanent magnets, such as samarium-cobalt (Sm—Co) permanent magnets that are sintered.

In addition, although the inner face 34a and the outer face 34b of the magnet pieces 34, which extends in a direction intersecting with the magnetizing direction, have a rectangular configuration, it is possible to reliably prevent or minimize breakage of the magnet pieces 34.

Further, although the inner face 34a and the outer face 34b of the magnet pieces 34 are elongated along a direction, i.e., a longitudinal direction of the boss portion 40 of the gear body 38, which extends in a direction intersecting with the magnetizing direction, it is possible to reliably prevent or minimize breakage of the magnet pieces 34.

Furthermore, because the magnet pieces 34 are disposed on the inner circumferential side of the boss portion 40 of the gear body 38, which is made of resin and having a cylindrical configuration, it is possible to reliably prevent or minimize breakage of the magnet pieces 34.

According to the method of molding the throttle gear 30 described above, the resin is injected into the cavity 90 of the mold 70 (see FIG. 7), while opposite ends of each magnet piece 34 in a direction intersecting with the magnetizing direction (i.e. opposite ends of each magnet piece 34 in the axial direction of the boss portion 40 of the gear body 38) is supported by the corresponding magnet support 80 of the stationary mold half 72 and the corresponding magnet support 87 of the movable mold half 74. Therefore, it is possible to reliably prevent the potential movement of the opposite ends of the magnet pieces 34 in a direction intersecting with the magnetizing direction due to unbalance of pressure. As a result, potential breakage of the magnet pieces 34 can be prevented or minimized.

In addition, each magnet piece 34 is supported by the corresponding magnet support 80 and the corresponding magnet support 87 at the corner portions 34e and 34f, which diagonally oppose to each other, of the opposite ends of the magnet piece 34 in the direction intersecting with the magnetizing direction (i.e. opposite ends of each magnet piece 34 in the axial direction of the boss portion 40 of the gear body 38). Therefore, contact areas of the opposite ends of each magnet piece 34 against the magnet supports 80 and 87 can be reduced and it is possible to prevent or minimize breakage of the magnet piece 34 due to contact with the magnet supports 80 and 87.

Further, the corner portions 34e and 34f of each magnet piece 34 are supported by the corresponding magnet supports 80 and 87, partly with respect to the ridgelines of the corner portions 34e and 34f. Therefore, contact areas of the opposite ends of each magnet piece 34 against the magnet supports 80 and 87 can be further reduced and it is possible to further prevent or minimize breakage of the magnet piece 34 due to contact with the magnet supports 80 and 87.

According to the detection device 18 (see FIG. 1) for detecting the degree of opening or the rotational angle of the throttle valve 16, it is possible to detect the rotational angle in a non-contact manner based on the output signal of the magnetic detecting element 64 of the cover 61 as the throttle gear 30 having the magnet pieces 34 rotates. Thus, it is possible to provide the detection device 18 or a rotational angle sensor that has the throttle gear 30 including the magnet pieces 34, the potential breakage of which is reliably prevented or minimized.

The present invention may not be limited to the embodiment described above but may be modified in various ways. For example, although the above embodiment has been described in connection with the throttle gear and the method of molding the throttle gear, the present invention can also be applied to various resin products molded with magnet pieces inserted and to methods of molding such resin products.

Although the rotational angle sensor is used for detecting the open angle of the throttle valve in the above embodiment, the rotational angle sensor may be used for detecting the rotational angle of any other rotary member.

Although the above embodiment has been described in connection with the throttle control device that has the throttle valve driven by the control motor, the present invention also may be applied to a throttle control device, in which the stepping movement of an accelerator pedal is mechanically transmitted to a throttle valve via a wire, a cable or an accelerator lever.

Further, although the throttle shaft and the throttle valve are mechanically joined to each other, the throttle shaft and the throttle valve may be molded into one piece by resin.

Furthermore, although the magnet pieces 34 are formed of samarium-cobalt magnets, the magnet pieces 34 may be formed of any other suitable magnets, such as neodymium (NdFeB) magnets and ferrite magnets. Additionally, although the magnet pieces 34 are formed of samarium-cobalt magnets as a sintered material, any other processes, such as a casting process, may form the magnet pieces 34. Further, although the magnet pieces 34 have a rectangular prism-like configuration, the magnet pieces 34 may have any other configurations, such as a cubic configuration, a triangular or hexagonal prism-like configuration or any other polygonal prism-like configuration, an arc-shaped column-like configuration and an elliptical column-like configuration.

Furthermore, although the upper mold half is configured as the stationary mold half and the lower mold half is configured as the movable die half in the above embodiment, the upper mold half may be configured as the movable mold half and the lower mold half may be configured as the stationary mold half.

The invention claimed is:

1. A resin-molded product, comprising:
   at least one magnet piece having opposite faces extending in directions intersecting with a magnetizing direction of the at least one magnet piece; and
   a resin portion molded with the at least one magnet piece by an insertion molding process;
   wherein the opposite faces of the at least one magnet piece are substantially embedded within the resin portion;
   and further including a sensor comprising a rotary member, the sensor further comprising a stationary side member including a magnetic detection element, so that a rotational angle of the rotary member can be detected in a non-contact manner based on an output signal from the magnetic detection element.

2. The resin-molded product as in claim 1, wherein each of the opposite faces has a substantially rectangular configuration.

3. The resin-molded product as in claim 1, wherein each of the opposite faces has a configuration elongated in one direction.

4. The resin-molded product as in claim 1, wherein the resin portion has a substantially cylindrical tubular configuration and an inner circumferential region, and the at least one magnet piece is disposed within the inner circumferential region.

5. The resin-molded product as in claim 1, wherein the stationary side member is disposed on a throttle body, and the throttle body defines an intake air channel that is configured to be opened and closed by a throttle valve.

6. A method of manufacturing a resin-molded product which product comprises:
   at least one magnet piece having opposite faces extending in directions intersecting with a magnetizing direction of the at least one magnet piece; and
   a resin portion molded with the at least one magnet piece by an insertion molding process;
   wherein the opposite faces of the at least one magnet piece are substantially embedded within the resin portion,
   said method comprising the steps of:
   providing a mold with a cavity for molding the resin-molded product;
   setting magnet supports in the mold cavity, the magnet supports supporting opposite ends of the at least one magnet piece with respect to directions intersecting with a magnetizing direction of the at least one magnet; and
   injecting molten resin into the mold cavity while the at least one magnet piece is supported by the magnet supports.

7. The method as defined in claim 6, wherein the magnet supports support corner portions of the opposite ends of the at least one magnet piece, and wherein the corner portions diagonally oppose to each other.

8. The method as in claim 7, wherein the magnet supports support the corner portions of the opposite ends of the at least one magnet piece partly with respect to the ridge lines of the corner portions.

9. A rotational angle sensing device comprising:
   a sensor including a magnetic detection element;
   a resin molded product including at least one magnet adjacent the sensor, at least one magnet having opposite faces extending in directions intersecting with a magnetizing direction of the at least one magnet, a resin portion molded with the at least one magnet by an insertion molding process, wherein the opposite faces of the at least one magnet are embedded within the resin portion;
   wherein the sensor includes a rotary member, the sensor further includes a stationary side member, so that a rotational angle of the rotary member can be detected in a non-contact manner based on an output signal from the sensor.

10. The rotational angle sensing device as in claim 9, wherein the stationary side member is disposed on a throttle body, and the throttle body defines an intake air channel that is configured to be opened and closed by a throttle valve.

11. A rotational angle sensing device comprising:
a sensor including a magnetic detection element;
a resin molded product including at least one magnet adjacent the sensor, at least one magnet having opposite faces extending in directions intersecting with a magnetizing direction of the at least one magnet, a resin portion molded with the at least one magnet by an insertion molding process, wherein the opposite faces of the at least one magnet are embedded within the resin portion, and further comprising a rotary member, the sensor further comprising a stationary side member so that a rotational angle of the rotary member can be detected in a non-contact manner based on an output signal from the sensor.

12. The rotational angle sensing device as in claim 11, and further comprising a throttle gear as the rotary member, the throttle gear being attached to a shaft of a throttle valve and configured to transmit rotation to the throttle valve, wherein the stationary side member is disposed on a throttle body, and the throttle body defines an intake air channel that is configured to be opened and closed by the throttle valve.

* * * * *